Nov. 25, 1930.  A. J. G. BOLARD  1,782,400
WHEEL LIFTING DEVICE
Filed June 21, 1928  2 Sheets-Sheet 1

INVENTOR
Alfred J. G. Bolard
BY Townsend & Decker
ATTORNEYS.

Patented Nov. 25, 1930

1,782,400

UNITED STATES PATENT OFFICE

ALFRED JEAN GUSTAVE BOLARD, OF VERNON, EURE, FRANCE, ASSIGNOR TO "RUSBOL", SOCIÉTÉ À RESPONSABILITÉ LIMITÉE, OF CLICHY, FRANCE, A CORPORATION OF FRANCE

WHEEL-LIFTING DEVICE

Application filed June 21, 1928, Serial No. 287,192, and in France March 29, 1928.

My invention relates to a wheel lifting device of the type in which jacks are employed for raising the wheels of a motor vehicle.

Briefly outlined the invention consists in disposing perpendicularly to the ground, a jack for each wheel of the vehicle, which jack is secured to the chassis of the vehicle and has either its fixed or movable member provided with a spring attached to the end of a cable whose other extremity is secured to the vehicle axle after having passed several times about a fixed member secured to the chassis of the vehicle.

The invention contemplates employing jacks of any suitable type known in the art suspended, during use by means of a sort of balance plate or other suitable suspension means which are attached to the spring above mentioned.

I arrange the parts in such a manner that when the jack is actuated and starts to expand it finally becomes wedged between the ground and the chassis of the vehicle. The cable is slightly slack and movement of the jack first tightens the cable and then the spring, but without appreciably displacing the axle with respect to the chassis due to the cable being wound several times about the fixed member, constituting idle turns and to the fact that the tension exerted on the cable by the jack is not transmitted to an appreciable extent to the portion of the cable between the fixed member and the axle. Then the jack commences to raise the chassis of the vehicle carrying with it the axle during its movement by means of the portion of the cable situated between the axle and the idle turns of said cable.

The objects of my invention will be obvious to those skilled in the art from the above outline and the invention will now be described more in detail with reference to the accompanying drawing, forming part of this specification and in which—

In each of the Figures, A represents the chassis of an automobile, B an axle thereof and C the wheel corresponding thereto.

Figure 1:
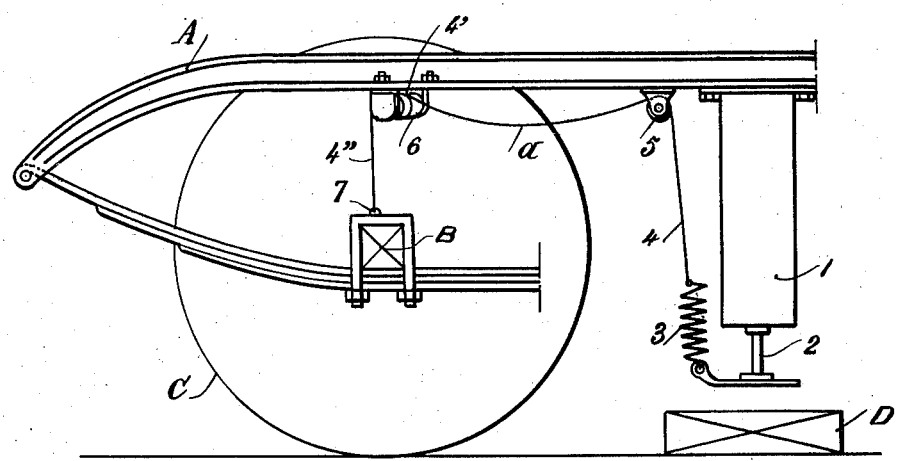
Fig. 1 is a side elevational view of my device in its normal position of rest.
Figure 2:
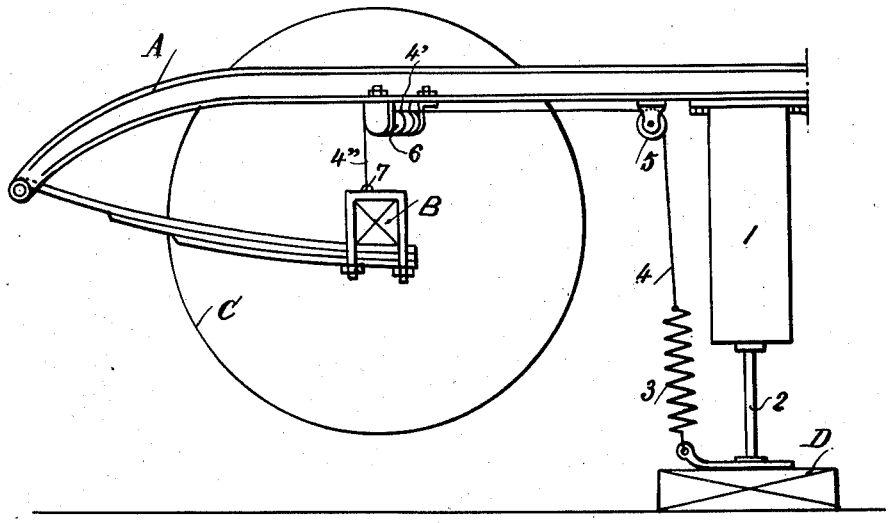
Fig. 2 is a similar view of my device with the parts in an operative position.

In the embodiment set forth in Figs. 1 and 2, fixed on the chassis A is a jack 1, of any suitable type, at the desired point on the said chassis. Obviously there might be a jack provided for each wheel, the single jack being shown only by the way of illustration. Likewise the operating means for the jack has not been shown since the same is well known in the art and forms no particular part of my invention. Suffice it to say that it may be adapted to be operated mechanically, manually, by the motor of the automobile or by other suitable control means, all of which means of operation are well known to those skilled in the art and need no further discussion. The movable element 2 of the said jack, of the usual plunger type, carries a spring 3 which in turn is attached to a cable 4 passing over an idle pulley 5 which cable has several idle turns 4' passed around a fixed element 6 rigid with chassis A and is finally attached to an eye 7 carried by the wheel hub B of wheel C.

The operation is as follows:

When the jack 1 is actuated, the movable part 2 thereof enters into contact with the ground, or if desired, with a block D placed on the ground therebeneath. The action of the jack continuing, the fixed part 1 thereof rises carrying with it the chassis A and subsequently through the medium of the portion 4'' of cable 4 the axle B and hence the wheel C of the vehicle.

The previous descent of the movable part 2 of the jack provokes no appreciable displacement of the axle B with respect to the chassis due to the slack portion $a$ of cable 4 and spring 3 as well as the dead turns 4' of said cable.

Figure 3:
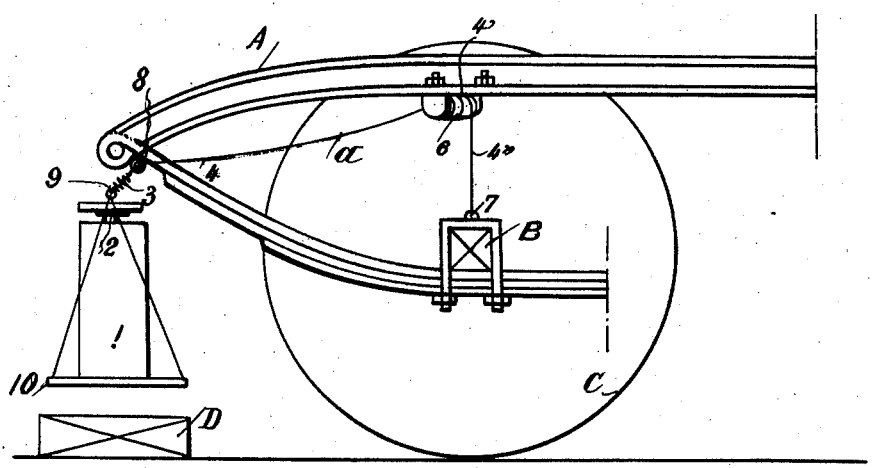
Fig. 3 is a view similar to Fig. 1 of a modification.
Figure 4:
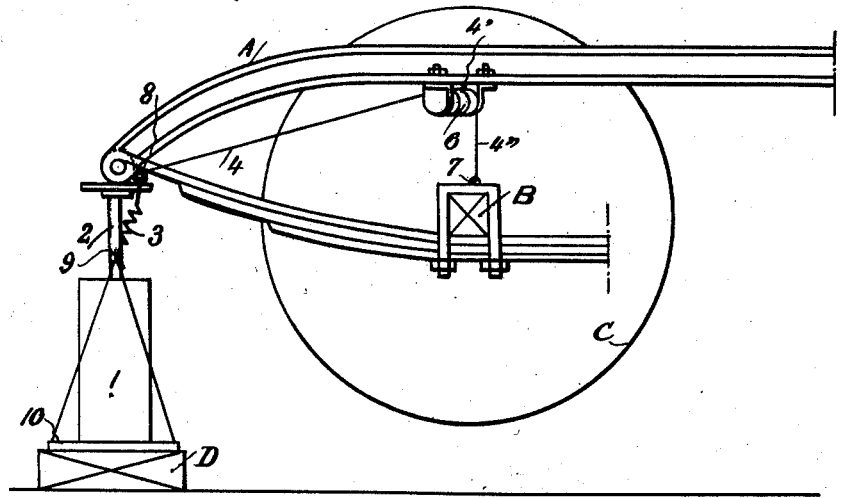
Fig. 4 is a view similar to Fig. 2 of the said modification.

In the modification of Figs. 3 and 4, the same cable 4 with its idle turns 4' will be noted, but this time the cable is passed through an eye 8 near the end of the chassis, the end of said cable adjacent said eye being fastened to a spring 3 having a hook 9. On the hook 9 is suspended what I term a balance plate 10 for lifting the wheel C of the vehicle and upon which bears the jack 1.

When the jack is actuated, the movable portion 2 thereof first abuts the chassis A and the operation continuing the plate 10 is lowered until it is caused to contact with the ground or with a block D placed therebeneath.

From this time on the operation is identical to that previously described in connection with the first embodiment. The advantages of this last embodiment reside in its great simplicity and facility of adapting to all types of vehicles, since it permits utilizing an ordinary portable jack which need not be put in place until ready for use.

It is to be noticed that with either of the embodiments described, during normal running of the vehicle, the axle is always free to move with respect to the chassis, when passing over rough stretches of roadway due to the slack arrangement of cable 4.

While I have disclosed what I term to be the preferred forms of my invention I do not wish to be limited thereby as there might be various changes in the construction and arrangement of parts without departing from the invention as comprehended within the scope of the appended claims.

Having described my invention what I claim as new and desire to secure by Letters Patent is:

1. In a wheel lifting device for vehicles having a chassis, wheels and axles, the combination of a jack carried by said chassis, a cable attached to said axle, a fixed member on said chassis about which said cable is wrapped and a spring connecting said cable to one of the elements of said jack.

2. In a wheel lifting device for vehicles having a chassis, wheels and an axle, the combination of a jack operatively associated with said chassis, a cable attached to said axle, a fixed member on said chassis about which said cable is wrapped, a spring connecting said cable to one of the elements of said jack and cable guiding means carried by said chassis between said jack and said fixed member.

3. In a wheel lifting device for vehicles having a chassis, wheels and an axle, the combination of a cable, a spring attached to said cable, guiding means for said cable carried by said chassis, a jack engageable with said chassis for lifting the same and means for attaching said cable and spring to said axle and jack for causing a movement of said axle on operation of said cable.

4. In a wheel lifting device for vehicles having a chassis, wheels and axles, the combination of a cable, a fixed member on said chassis about which said cable is wrapped, a spring attached to said cable, a jack provided with an element movable toward or from said chassis, and means for attaching said cable and spring to said axle and element for moving said axle on movement of said element.

5. In a wheel lifting device for vehicles having a chassis and an axle movable relatively to the chassis, a lifting jack operatively associated with said chassis for lifting the same, a fixed member carried by said chassis, a cable supported in part by said fixed member and provided with a resilient element, and means for attaching said cable and resilient element to said axle and to said jack to cause said axle to be drawn upwardly on operation of said jack.

In testimony whereof I have affixed my signature.

ALFRED JEAN GUSTAVE BOLARD.